United States Patent [19]
Frankel et al.

[11] Patent Number: 5,283,900
[45] Date of Patent: Feb. 1, 1994

[54] REAL-TIME OPERATING SYSTEM AND VIRTUAL DIGITAL SIGNAL PROCESSOR FOR THE CONTROL OF A DIGITAL SIGNAL PROCESSOR

[75] Inventors: Robert E. Frankel; David M. Lindsay; David A. Russo; David Y. Wong, all of Santa Barbara, Calif.

[73] Assignee: Spectron Microsystems, Inc., Santa Barbara, Calif.

[21] Appl. No.: 415,882

[22] Filed: Oct. 2, 1989

[51] Int. Cl.$^5$ .................. G06F 9/455; G06F 15/31; G06F 15/332; G06F 15/347
[52] U.S. Cl. .................. 395/700; 395/500; 395/650; 364/DIG. 1; 364/228.2; 364/232.1; 364/232.3; 364/242.4; 364/280; 364/280.9; 364/281.3
[58] Field of Search .......... 364/721, DIG. 1, DIG. 2; 395/200, 275, 650, 700, 705, 800, 500; 340/717

[56] References Cited

U.S. PATENT DOCUMENTS

| | | | |
|---|---|---|---|
| 4,412,281 | 10/1983 | Works | 395/575 |
| 4,475,156 | 10/1984 | Federico et al. | 395/700 |
| 4,494,188 | 1/1985 | Nakane et al. | 395/700 |
| 4,509,851 | 4/1985 | Ippolito et al. | 355/204 |
| 4,525,780 | 6/1985 | Bratt et al. | 395/425 |
| 4,525,795 | 6/1985 | Rubin | 364/721 |
| 4,542,455 | 9/1985 | Demeure | 395/650 |
| 4,633,466 | 12/1986 | Laws et al. | 371/16.1 |
| 4,736,318 | 4/1988 | Delyani et al. | 395/700 |
| 4,779,187 | 10/1988 | Letwin | 395/725 |
| 4,811,216 | 3/1989 | Bishop et al. | 395/425 |
| 4,825,358 | 4/1989 | Letwin | 395/700 |
| 4,833,594 | 5/1989 | Familetti et al. | 395/700 |
| 4,887,202 | 12/1989 | Tanaka et al. | 395/700 |
| 4,907,229 | 3/1990 | Edwards | 395/575 |
| 4,918,596 | 4/1990 | Nakano | 395/650 |
| 4,926,355 | 5/1990 | Boreland | 395/725 |
| 4,972,314 | 11/1990 | Getzinger et al. | 395/650 |
| 5,008,853 | 4/1991 | Bly et al. | 340/717 |
| 5,021,947 | 6/1991 | Campbell et al. | 395/800 |
| 5,057,996 | 10/1991 | Cutler et al. | 395/650 |
| 5,060,150 | 10/1991 | Simor | 395/650 |
| 5,095,427 | 3/1992 | Tanaka et al. | 395/700 |

OTHER PUBLICATIONS

"*Getting Started with SPOX*," Spectron Microsystems, Inc. publication DN 80102-C (Mar. 31, 1989).
"*SPOX Programming Reference Manual*," Spectron Microsystems, Inc. publication DN 80101-E (May 11, 1989).
"*Adding Math Functions to SPOX [TMS320C30 Version]*," Spectron Microsystems, Inc. publication DN 80105-B (Mar. 31, 1989).

(List continued on next page.)

Primary Examiner—Thomas C. Lee
Assistant Examiner—John C. Loomis
Attorney, Agent, or Firm—Merchant, Gould, Smith, Edell, Welter & Schmidt

[57] ABSTRACT

A data processor, such as a digital signal processor, that has augmented memory, I/O and math units for real-time performance of complex functions, is placed under the control of a group of abstract object-oriented modules arranged with an underlying operational nucleus that includes a real-time kernel. The modules are hierarchically configured, with the lowest being an array object type that references memory allocations. A stream object type, based on the arrays, defines channels between application software and data devices. A vector object type, also based on the arrays, establishes structure within allocated blocks and also enables vector math functions to be undertaken by the vector module. Matrix and filter object types utilize the arrays and vectors in sequences controlled by the corresponding matrix and vector modules. The system provides a model of DSP functionality that is hardware independent, and an interface between high level language calls and highly efficient routines executed in assembly language. With this arrangement a large library of math functions is held available for use in real-time operations of complex nature.

25 Claims, 10 Drawing Sheets

OTHER PUBLICATIONS

"Compiling and Linking SPOX Programs [TMS320C30 Version]," Spectron Microsystems, Inc. publication DN 82018-A (May 31, 1989).

"*SPOX-RTK User's Guide [TMS320C30 Version]*," Spectron Microsystems, Inc. publication DN 82016-B (May 31, 1989).

"*SPOX-RTK Reference Manual [TMS320C30 Version]*," Spectron Microsystems, Inc. publication DN 82017-B (May 31, 1989).

"*SPOX-RTK Installation Notes [TMS320C30 Version]*," Spectron Microsystems, Inc. publication DN 82015-A (May 31, 1989).

"*SPOX-XDS User's Guide*", Spectron Microsystems, Inc. publication DN 80103-C (Mar. 31, 1989).

"*The C Programming Language,*" Kernighan and Ritchie, 2nd Edition, Prentice Hall, Englewood Cliffs, N.J. 07632 (1988).

"*Third Generation TMS320 User's Guide, SPRU031*", Texas Instruments (Aug., 1988).

"*TMS320C30 C Compiler Reference Guide,*" Texas Instruments, SPRU034 (Dec. 1988).

"*TMS320C30 Assembly Language Tools User's Guide*", SPRU035, Texas Instruments (Nov., 1988).

"*TMS320C30 Application Board User's Guide, SPRU040,*" Texas Instruments (1989).

"*TMS320C30 Software Development System User's Guide,*" SPRU013, Texas Instruments (Sep. 1988).

"*TLC320441, TLC32044C Voice-Band Analog Interface Circuits,*" D3098, Texas Instruments (Mar. 1988).

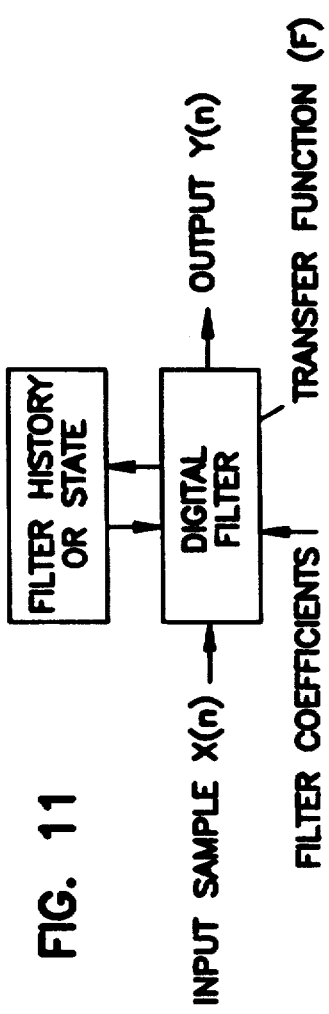
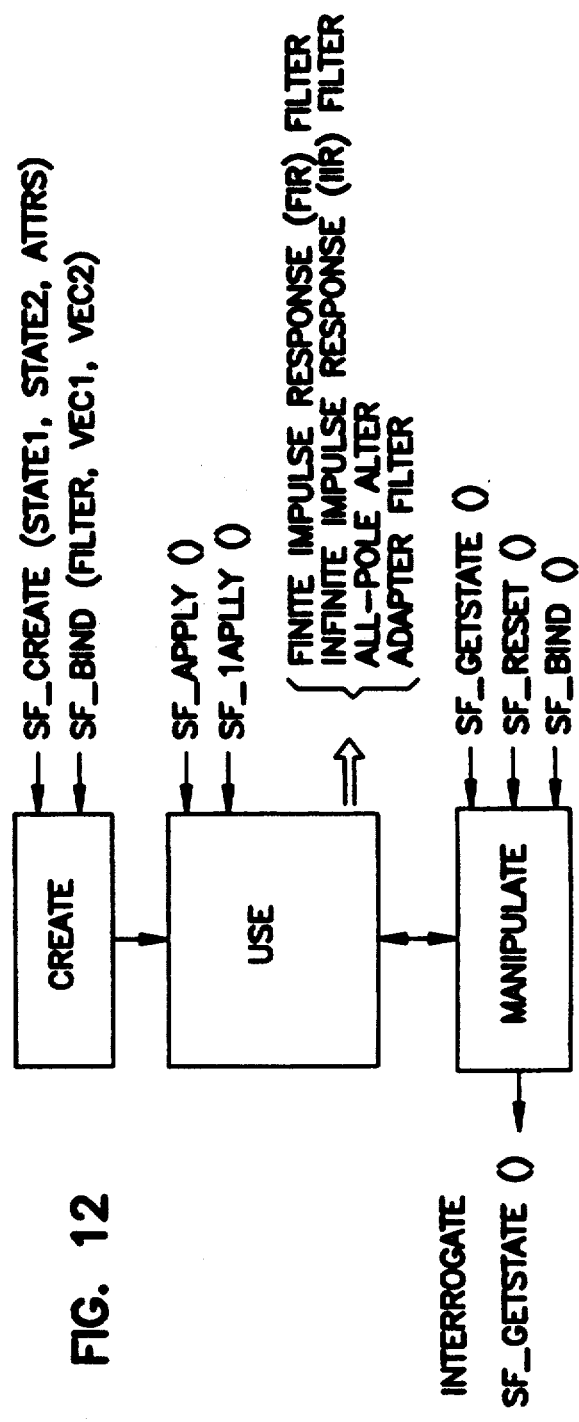

REAL-TIME OPERATING SYSTEM AND VIRTUAL DIGITAL SIGNAL PROCESSOR FOR THE CONTROL OF A DIGITAL SIGNAL PROCESSOR

BACKGROUND OF THE INVENTION

This invention relates to signal processing systems, and more particularly to systems and methods for operating digital signal processor-based systems in such fashion that they can readily be programmed in high level language to perform complex functions while at the same time making best use of the specially designed capabilities of the systems and processors.

Single chip digital signal processors (DSPs) were first introduced about ten years ago. They were highly specialized processors designed for executing numerical algorithms such as Fast Fourier Transform (FFT) and digital filters. The designs were usually characterized by pipelining arrangements for high speed arithmetic, memory, access and I/O functions. In the last few years, DSPs have begun to include more general purpose hardware capabilities that allow them to take on very large application programs which may also include system functions such as real-time control, communication with other processors, memory management, and I/O management. For many applications they are employed as a co-processor together with a general purpose microprocessor as the host. This combination provides greatest versatility while enabling the DSP to function most efficiently for particular operations. Because of the limited capabilities of the earlier generation DSPs, the software tools available for them are relatively primitive. Typically, the first and second generation DSPs are programmed in assembly level languages that are highly specific to the DSP hardware. With the introduction of the newer and more powerful (third and fourth generation) DSP architectures, assembly language programming poses severe limitations to writing large programs with more functionality. Because of the high cost of software for large application programs, portability across different DSP architectures has also become an important consideration.

A first step towards solving the software demands of the new DSPs is the development of standard high level programming languages (for example C language) for DSPs. Such standard programming languages provide significant improvement in the programmability of DSPs and the portability of application programs from one DSP platform to another. Standard high level languages like C, however, are deficient in addressing several critical requirements of real-time signal processing systems based on DSPs. Applications written in C cannot take advantage of the highly specialized architectures of DSPs. A signal processing algorithm written in C may be only 5% efficient compared to an assembly programmed version of the same algorithm. Furthermore, high level languages like C do not address other system requirements of signal processing applications, such as control, I/O, and memory management. One of the prior approaches toward facilitating programming signal processing algorithms for DSPs is to provide math libraries coded in assembly language. Some of these libraries are program segments which must be inserted into the user's assembly language program by "cut-and-paste". A number of manufacturers of signal processing systems or floating point accelerators have also developed math libraries which are callable from a standard language like C or Fortran. While such math libraries can save programmers time and effort in learning the intricate details of signal processing algorithms and hardware architectures, they are often highly specific to the manufacturer's hardware system. Such math libraries provide only acceleration for mathematical routines and do not address other system functions (such as I/O and memory management) which are also critical to performance.

Some of the software requirements for DSPs discussed above are similar to those encountered by users of general purpose microprocessors for advanced real-time control applications. A number of real-time operating systems or real-time kernels have been developed for general purpose microprocessors to address the software need. These real-time kernels are essentially a library of routines that provide high level capabilities, such as task scheduling and synchronization, needed in many real-time control applications. Some of the real-time kernels also provide I/O and communication functions. Real-time operating kernels for general purpose microprocessors, however, are not typically appropriate for DSP applications. They also do not satisfy key requirements of DSP applications, such as mathematical, memory management, and I/O functions that make efficient use of DSP architecture and associated hardware peripherals.

There is a need, therefore, for a real-time operating system approach for DSPs which addresses and meets the more comprehensive needs of DSP architectures for both programming and operating efficiency. Such a system provides a basis for improving the operation of any general purpose microprocessor-based system as well.

Relative to programming efficiency and providing a hardware independent interface object-oriented programming approaches have been widely adopted for general purpose computers, but these have largely been notably inefficient and therefore not appropriate for signal processing. The present invention provides a highly efficient object-oriented system for signal processing and other purposes.

The following, previously published, documents are referenced as supplying details of implementation of various operating sequences or associated hardware or software, in systems and methods in accordance with the invention:

1. "Getting Started with SPOX," Spectron Microsystems, Inc. publication DN 80102-C (Mar. 31, 1989).
2. "SPOX Programming Reference Manual," Spectron Microsystems, Inc. publication DN 80101-E (May 11, 1989).
3. "Adding Math Functions to SPOX [TMS320C30 Version]," Spectron Microsystems, Inc. publication DN 80105-B (Mar. 31, 1989).
4. "Compiling and Linking SPOX Programs [TMS320C30 Version]," Spectron Microsystems, Inc. publication DN 82018-A (May 31, 1989).
5. "SPOX-RTK User's Guide [TMS320C30 Version],"Spectron Microsystems, Inc. publication DN 82016-B (May 31, 1989).
6. "SPOX-RTK Reference Manual [TMS320C30 Version]," Spectron Microsystems, Inc. publication DN 82017-B (May 31, 1989).
7. "SPOX-RTK Installation Notes [TMS320C30 Version]," Spectron Microsystems, Inc. publication DN 82015-A (May 31, 1989).

8. "SPOX/XDS User's Guide," Spectron Microsystems, Inc. publication DN 80103-C (May 31, 1989).

9. "The C Programming Language," Kernighan and Ritchie, 2nd Edition, Prentice Hall, Englewood Cliffs, NJ 07632 (1988).

10. "Third Generation TMS320 User's Guide, SPRU031," Texas Instruments (August, 1988).

11. "TMS320C30 C Compiler Reference Guide," Texas Instruments, SPRU034 (December, 1988).

12. "TMS320C30 Assembly Language Tools User's Guide,"SPRU035, Texas Instruments (November, 1988).

13. "TMS320C30 Application Board User's Guide, SPRU040," Texas Instruments (1989).

14. "TMS320C30 Software Development System User's Guide," SPRU013, Texas Instruments (September 1988).

15. "TLC320441, TLC32044C Voice-Band Analog Interface Circuits," D3098, Texas Instruments (March 1988).

SUMMARY OF THE INVENTION

Systems and methods in accordance with the invention utilize abstract objects arranged in hierarchical fashion to enable a high level programming language to be used in accessing a wide variety of available functions. This approach is founded on the basic identifiers of memory blocks ("arrays"), which serve in the construction of higher level objects for channels for data flow ("streams"), for one-or two-dimensional views of memory in any identified block ("vectors" and "matrices" respectively), and for transfer function operations ("filters"). These hierarchical objects are supported by a real-time, multi-tasking system core that manages memory, interrupts, and task-switching. The system also includes capabilities of performing I/O operations on an attached host processor file system. The user of the system is thus not required to be cognizant of the underlying hardware resources, but can program concisely in high level language to carry out operations in ways for which the DSP is best suited. Moreover, the operations are realized by employing different entries in a broad but integrated library of math and other functions expressed and executed at high speed. Some of these may be expressed in assembly language for maximum speed. Application programs using this high level interface are portable between different microprocessor hardwares, including microprocessors which are not confined to the characteristic DSP architectures. Abstract objects in accordance with the invention can also be used with other architectures to provide benefits in efficiency and versatility, or both.

More particularly, as one example in accordance with the invention, a virtual DSP machine (a processor independent module of DSP functionality) for a DSP system, with memory and peripherals, comprises a number of hierarchical object managers or modules supported by a nucleus with real-time kernel for memory management, device driver support, and preemptive, interruptible multi-tasking. Using the arrays and unstructured reference to memory allocations, a stream object manager creates real-time stream I/O as fixed or variable length blocks that provide continuously available data for transfer, including device type and buffer size as attributes, but unencumbered by the need for programming details as to timing, storage locations and hardware configurations. A vector manager also employs the arrays as basic blocks, in taking one-dimensional views of an array based upon length, base and stride (in positive or negative sense) attributes for use in vector operations. Matrices have these and shape attributes as well, and the matrix manager employs these in the performance of chosen matrix math functions. Both vectors and matrices can be dynamically altered, and both can be used to call entries from a large library of math functions, expressed in assembly language for high speed execution. The highest level abstract object in this combination is a filter object, since both arrays and vectors may be employed in creating and binding coefficients and establishing filter types. The object managers serve as interfaces between the high level language calls and the assembly language routines.

Abstract objects arranged in hierarchical fashion in accordance with the invention have independent applicability to general purpose microprocessor-based systems, because they can improve efficiency or versatility.

In accordance with other features of the invention, separate modules may comprise drivers for pseudo-devices such as software generators and file devices, as well as hardware-oriented devices, such as A to D converters. Also, widely used functions such as Fast Fourier Transform and correlation are provided. In addition it is advantageous to incorporate software generators for a number of widely used signal characteristics, such as random noise, sine waves, and constant value signals.

In accordance with another aspect of the invention, a software development system is provided, based upon the combination of a DSP hardware subsystem with a virtual DSP machine supported on a system nucleus and including standard I/O functions and a host computer system with its own operating system. The DSP and host run concurrently and communicate with each other during operation. The development system enables programmers to write DSP applications in high level language and execute them on the DSP subsystem. DSP applications running on the DSP can communicate with and access the file system of the host, which can also communicate with the DSP.

BRIEF DESCRIPTION OF THE DRAWINGS

A better understanding of the invention may be had by reference to the following description, taken in conjunction with the accompanying drawings, in which:

FIG. 11 is a block diagram depicting the organization of filters; and

FIG. 12 is a flow chart illustrating in general terms the creation, use and manipulation of filters.

DETAILED DESCRIPTION OF THE INVENTION

Figure 1:
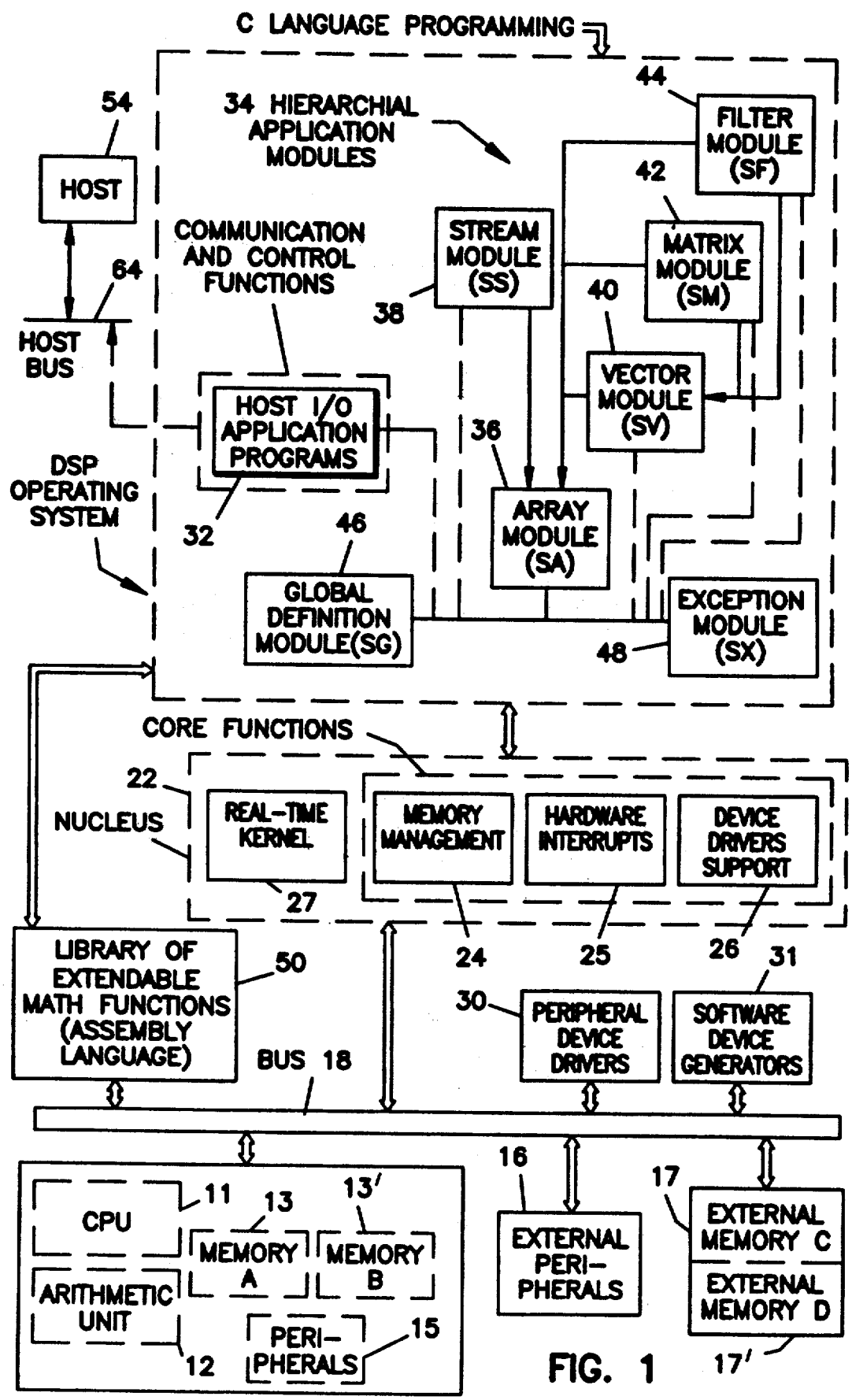
FIG. 1 is a block diagram of a system in accordance with the invention that may be characterized as incorporating a virtual DSP machine.

Systems in accordance with the invention will be described as organized for use with a specific DSP, but may be employed with any DSP, and with other processor types as well, where large libraries of math functions, multiple memory segments and fast I/O are used in a multi-tasking environment. The specific DSP 10 referred to is the Texas Instruments TMS320C30 floating point system, described in Reference publications (10), (11) and (12). This system includes a CPU 11, arithmetic unit 12, and a number of different memory segments, illustrated only symbolically as memory A and memory B, numbered 13 and 13' respectively and comprising memories of different speeds and sizes. A variety of peripherals 15, such as system bus, analog-to-digital converters, and serial ports, are also employed, some of which may be on-chip. These details are not specifically illustrated inasmuch as the system provides high level language independence from peripheral hardware requirements and characteristics, and because specifics may be obtained from Reference publications (10) (11) and (12). External peripherals 16 and external memories C and D, 17 and 17' respectively, are coupled to the DSP 10 via a system bus 18.

The DSP operating system 20, referring now to FIG. 1, consists of three main subsystems: (1) a system nucleus 22 which includes a memory management module 24, hardware interrupt support 25 for device drivers, peripheral device driver support 26, and a real-time kernel 27; (ii) device drivers 30 for different physical I/O devices such as analog-to-digital devices and a system bus, software device generators 31, which may be regarded as pseudo-devices; (iii) application modules 34, which include host I/O 32, array, stream I/O, vector, matrix, and filter modules 36, 38, 40, 42 and 44 respectively. The host I/O module 32 comprises a "stdio" interface for a C language based system, useful in conjunction with the development system of FIG. 2 but not otherwise necessarily used. The application modules also include a global management module 46 and an exception module 48, which service all the others. This operating system also includes a library of math functions 50 held in assembly language for high speed execution of DSP specific routines. The system 20 provides a high level language (here C language) interface with the DSP 10. The array 36, stream 38, vector 40, matrix 42 and filter modules 44 are arranged in a hierarchy based on the array module 36, and together with the nucleus constitute a virtual DSP machine.

The system nucleus 22 serves as a foundation for all other elements of the architecture. The core functions comprise the lowest tier of the system nucleus. They provide the following rudimentary services required by the remainder of the nucleus:

a. The memory management mechanism 24, for allocating variable-sized blocks of memory from different memory segments; memory segments can be specified statically through a configuration parameter, or else be defined at run-time.

b. The hardware interrupt functions 25, for handling and controlling interrupts generated by the system's peripheral devices; interrupt service routines can be bound to particular hardware vectors and synchronized with program execution.

The multi-tasking real time-kernel 27 includes capabilities functionally similar to those found in a real-time multi-tasking kernel:

a. Creating and manipulating task objects;

b. Creating and manipulating gate objects for inter-task communication;

c. Creating and manipulating condition objects which allows a task to be suspended until an event or condition is signaled by another task; and d. Functions for managing software interrupts triggered from hardware interrupt service routines.

Details on the multi-tasking kernel are documented at length in Reference publications (5), (6) and (7) and therefore are not repeated here. From review of such publications it will be noted that gates and conditions are implemented in particularly advantageous fashion.

The peripheral device driver support 26 provides a device-independent interface between application programs and hardware-specific device drivers. These functions include:

a. Binding of program I/O to device driver;

b. Exchanging data between the application program and the device driver;

c. Managing lists of I/O data frames; and d. Arbitrating program access to global resources inside drivers.

Because device drivers of this device-independent type are widely used in a number of different systems and are not significant to the inventive concepts they are not further described. The device drivers 26 provide software interfaces to physical devices such as analog-to-digital converters or an I/O port.

The operating system 20 also provides some software device generators 31 for generating signals (such as white noise, sinusoids) and file devices for reading and writing to computer files, as is described in greater detail below. For further discussion of software device generators in this system see Reference publication (1), Section 5 and Reference publication (8), Section 7.

The application modules that form a hierarchy 34 are shown in somewhat idealized form in FIG. 1. The standard I/O module 32 provides a means for accessing a host, as in the development system of FIG. 2. Each other hierarchical module 36, 38, 40, 42, 44 is organized around a particular type of abstract object which encapsulates a set of related constants, data types, and functions. Each of these associated modules also provides functions for creating and manipulating the objects. The exception module 48 is used by all the other modules to provide a consistent exception handling mechanism. For specific details see Reference publication (1), Section 9. The global definitions set by the global definition module 46 is a table which describes the overall configuration of the system such as the symbolic names of the memory segments. It is discussed in greater detail in Reference publication (8), Section 7.

The lowest level object is the array, provided by the array module 36. Each module is additionally designated by a two-character code (e.g. SA, SS, etc.) which serves as an identifier in programming the system in high level language. The higher level objects—streams (SS), vectors (SV), matrices (SM), filters (SF)—are each built upon arrays (SA), while matrices and filters are additionally built on vectors. Global definitions (SG) and exceptions (SX) serve all the modules.

The list below outlines the major features of each of the abstract objects and the corresponding modules, which are considered at greater length in conjunction with FIGS. 4 to 11.

a. The Array Module (SA) creates arrays and allocates memory from different logical memory segments from possibly different physical memories to provide a foundation for other types of objects.
   b. The Stream Module (SS) creates streams, binds devices to application programs via I/O streams, performs device-independent block and message I/O to or from arrays, and invokes device-specific control functions.
   c. The Vector Module (SV) creates vectors that provide a structured 1D view of an array, dynamically alters a vector's view, performs standard vector math functions, and provides a foundation for matrices and filters.
   d. The Matrix Module (SM) creates matrices that provide a structured 2D view of an array, dynamically alters a matrix's view, and performs standard matrix math functions.
   e. The Filter Module (SF) creates FIR and IIR filters, binds filter coefficients and manages the filter state, and applies a filter to a vector of data.
   f. The Exception Handler Module (SX) manages system and application exceptions, classifies exceptions as major or minor, and binds handlers to different exceptions.
   g. The Global Definition Module (SG) provides symbolic names for system memory segments, provides symbolic names for system device types, and defines miscellaneous configuration parameters.

Figure 2:
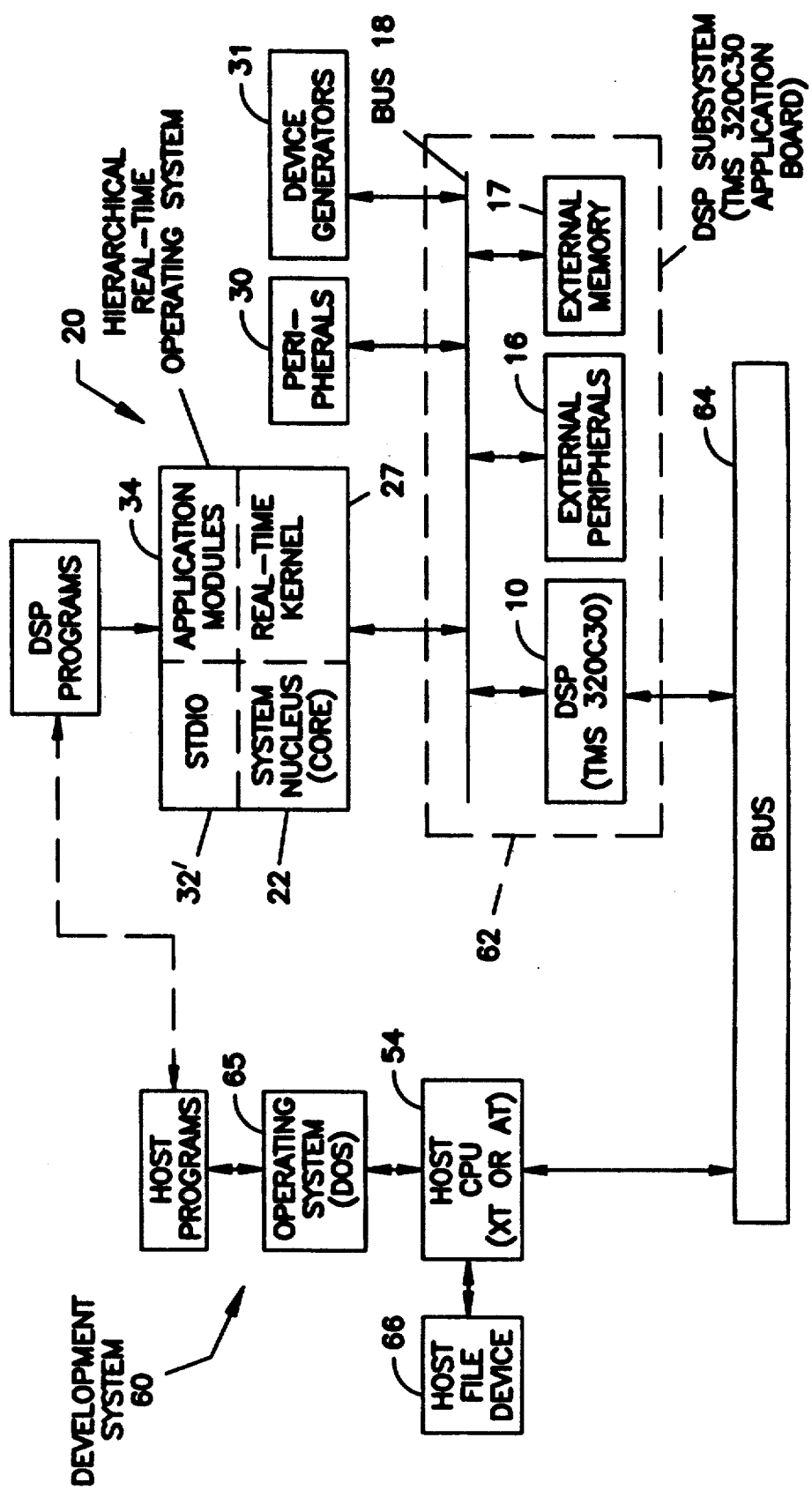
FIG. 2 is a block diagram of the principal elements of a software development system combining a general purpose processor with the virtual DSP machine.

A preferred example of the realization of the real-time operating system and the virtual DSP machine is provided by a software development system 60 using the Texas Instruments TMS320C30 floating point DSP, as shown in FIG. 2. The development system 60 includes a DSP subsystem 62 such as the TMS320C30 application board 62 as described in Reference publications (13) and (4), that plugs into a standard PC XT or AT bus 64 for a host computer 54 of the AT or XT bus type, running a DOS operating system 65 and incorporating a large file device 66. The DSP subsystem 62 includes the external peripherals 16 and external memories 17, both shown only generally.

The standard I/O application module 32 enables the DSP 10 to access the PC DOS file system through the stdio interface of the C programming language, as described in Reference publication (9). A host I/O application module 32 in the system of FIG. 2, shown as the "stdio" module 32' in FIG. 2, passes data between the DSP subsystem 62 and a host computer 54 via the bus as a physical link. The data is packaged as a remote procedure call or a message and sent across the physical link. A device driver on either side of the link (not specifically shown) can interpret the message and act on it accordingly. As an example, a program executing on the DSP 10 can read or write a block of data to the host's file system using this I/O mechanism as if the file system is local to the DSP.

Figure 3:
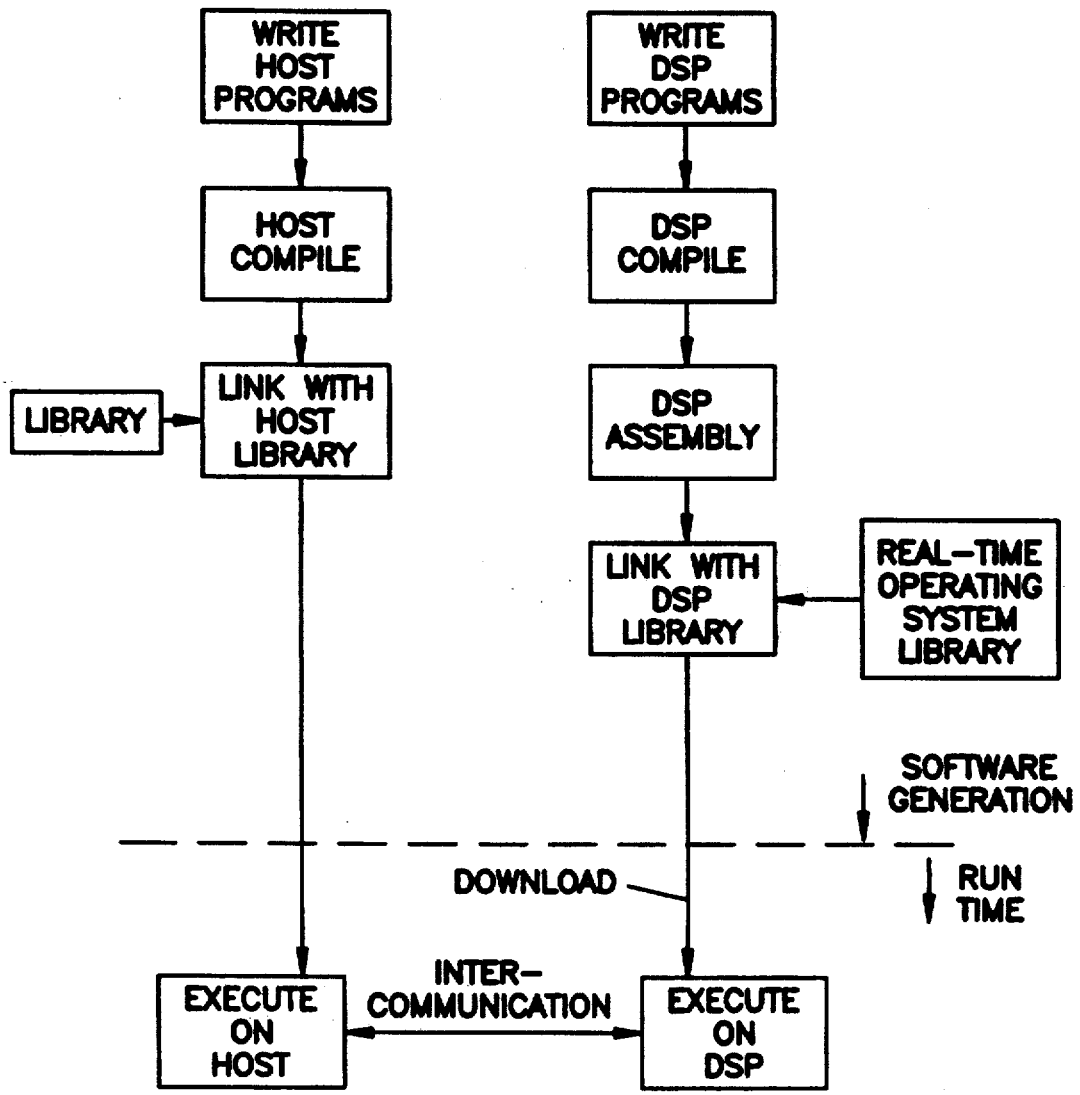
FIG. 3 is a flow chart for the generation and execution of programs in the development system of FIG. 2.

A program generated as shown in FIG. 3 can access the DOS file system by making stdio calls such as printf or fopen. One or more C stdio calls are interpreted and formatted by the standard I/O application module 31' into basic I/O functions for the DOS operating system 65 and file device 66 and passed to the host driver internal to the DSP system 62. The host driver packages the DOS I/O function into a message and sends the message to the host 54 via the shared memory of the DSP subsystem 62. The message is picked up by a driver program running on the host 54, which polls the shared memory for any new message. When it detects a new message, it interprets the message into standard DOS I/O functions and executes the functions under DOS. Any message or data that is to be passed back from DOS is packaged by the DSP driver in the host 54 as a message and sent to the DSP subsystem 62 via the shared memory 17. The host driver running on the DSP subsystem 62 reads the message from the shared memory 17 and signals the kernel to resume execution of the task on the TMS320C30 that is waiting to execute.

The real-time operating system 20 enables programmers to write and execute highly efficient DSP applications in the C programming language on the DSP subsystem 62, as illustrated in general form in FIG. 3. With standard I/O capability, the system enables a standard C program to execute on the DSP board and access the DOS file system of the host as if the program is executing locally on the host. Programs on the DSP system and host run concurrently, exchanging data as needed.

Using the DSP specific application modules in the DSP operating system, programs can perform highly efficient mathematical and I/O functions on the DSP hardware without having to resort to assembly language programming or be aware of the low level details of the hardware system. The DSP can run in real time, even though the host does not, for particular tasks. Furthermore, because of the "virtual DSP machine" interface of the DSP operating system, programs written for the DSP development system will run on other DSP hardware platforms or a general purpose computer that also support the application modules through a re-compile and/or re-link.

FIG. 3 depicts the broader aspects of some sequences involved in generating and running software for the development system. Specific examples and particular steps are not given, because they are included in Reference publications (1) (2), (4), (8), (11), (12), (13) and (14). However, it will be appreciated that the sequence involves initial writing and compiling of programs for both processors. The host programs are linked with the host library, while the DSP programs are assembled and then linked with the chosen math functions in the DSP library. After verification that both systems are ready to run, each executes its programs, interchanging data blocks as needed for the overall task.

One practical example of usage of this system for both software development and useful signal processing may be referred to, in order to show its versatility and efficiency in obtaining a complex result. An acoustic input is digitized and the frequency spectrum analyzed in real-time, using filtering, windowing, autocorrelation, matrix inversion and fast Fourier Transform. The results are constantly supplied to the host, which generates a varying or sampling display of output spectrum characteristics, such as frequency nodes, in the input signal. This constitutes a spectral estimation technique employing linear prediction that functions in the presence of noise. It is executed readily on the development system because of the I/O, memory and math functions that are readily available.

All DSP specific functions of the operating system are organized as modules of functions that operate on the object types: array, vector, matrix, filter and stream. An object is implemented as a C structure. A set of functions are provided for manipulating and querying these structures, as set forth immediately below.

Arrays—An array object references a block of memory allocated by the operating system memory management module 24 (FIG. 1). This block of memory can be in any of the different memory segments, namely the DRAM (slower dynamic RAM), dual-ported I/O RAM for communicating with the PC, SRAM (zero wait state static RAM), and on-chip RAM of the TMS320C30 board. There are at least two attributes associated with each array: the physical size of the memory buffer allocated for the array and the memory segment in which the buffer is located. (The array object here is not a "C array", although C arrays can be created.) The third attribute comprises a pointer to an attribute structure, such as an alignment field (align) or a specific address (buf).

There are two major uses for arrays. First, arrays are employed by the stream I/O functions to input/output data from./to streams. Second, arrays form the basis for higher-level data objects. The memory buffer in an array has no structure. It is simply a number of consecutive storage locations. The operating system vector and matrix objects impose a 1D or 2D structure on the memory buffer, and also associate a data type (Int, Float, Complex) with the memory locations.

Figure 4:
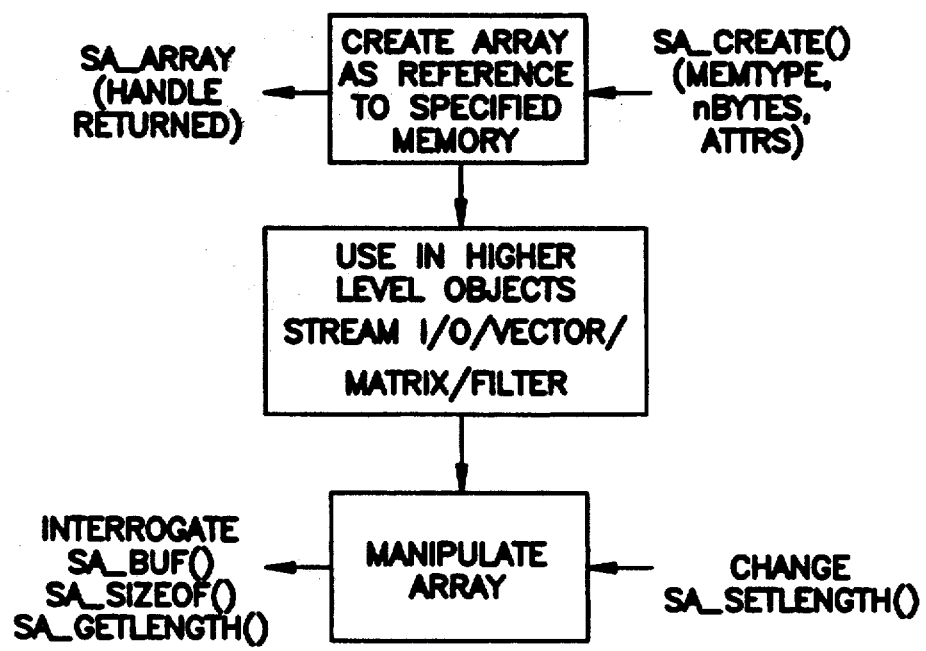
FIG. 4 is a flow chart illustrating the manner of defining and manipulating arrays.

Arrays can be created, manipulated and queried by a number of functions: $SA_{13}create()$, $SA_{13}buf()$, $SA_{13}alloc()$, $SA_{13}sizeof()$, $SA_{13}setlength()$, as seen in FIG. 4. When created, the variable "array" (as in $SA_{13}array$) is the "handle" or pointer to the newly created object. Details for these functions are documented in Reference publication (1), Section 4, and in publication (2), Section 2.

Streams—A stream object is a channel through which data flows between an application program and an I/O device. A conceptual representation of a stream is provided in FIG. 5. The channel 70 can be read (input) or write (output) flow paths between an application program and an I/O device 72, which includes software device drivers. Streams provide a simple and universal interface to all I/O devices. How the device operates is hidden from the application. The same functions are used to read and write a stream, whether it is connected to an analog-to-digital converter, a serial port, or a software generator.

Figure 6:
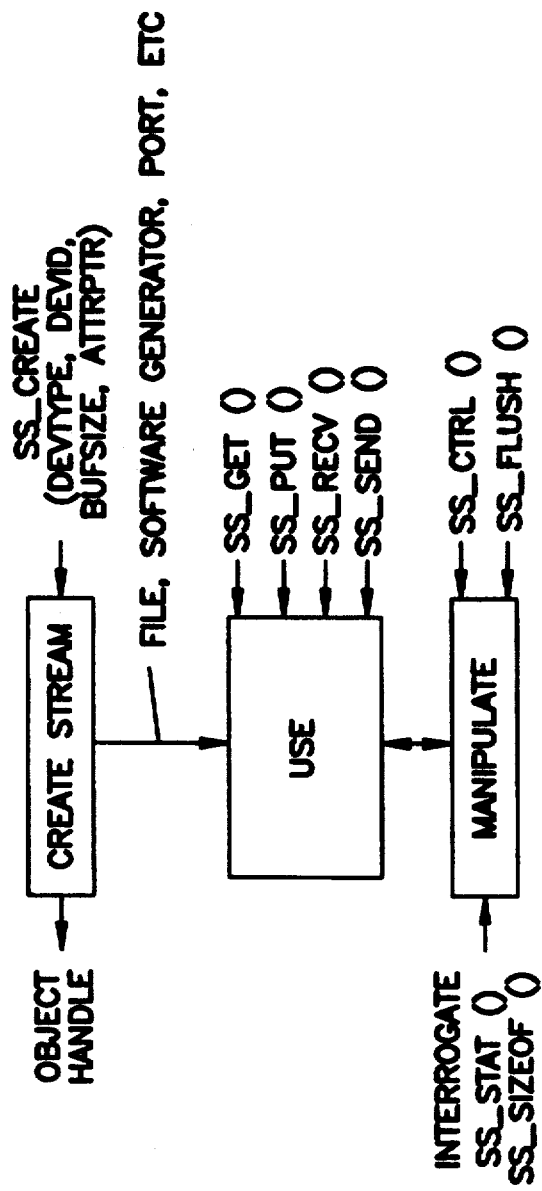
FIG. 6 is a flow chart illustrating in general terms the creation, use and manipulation of streams.

When a stream is created, as seen in FIG. 6, the device type is specified along with the buffer size. Other attributes, such as block size, number of buffers and mode, are used to set device parameters.

Two types of I/O are available. Block I/O uses fixed-length blocks of data, while message I/O uses a variable amount of data for each I/O operation. For block I/O, which is the most efficient type of I/O, the functions $SS_{13}get()$ and $SS_{13}put()$ are used to perform I/O with stream objects. More flexible, but less efficient, message I/O allows variable length input and output with stream objects. $SS_{13}recv()$ and $SS_{13}send()$ are used for message I/O.

Figure 5:
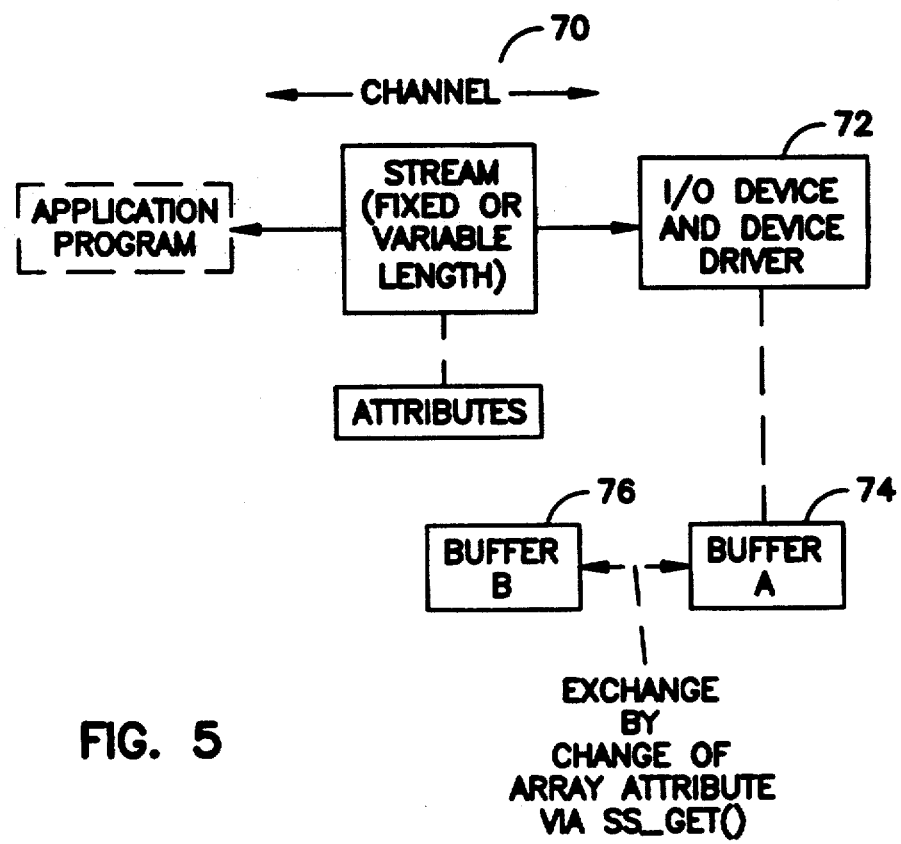
FIG. 5 is a block diagram conceptually illustrating a stream and the manner in which buffers can be exchanged during data transfer.

An important part of block I/O in the operating system is buffer management. To provide efficient I/O operations with a low amount of overhead, the operating system avoids copying data from one place to another during I/O operations. Instead, the operating system swaps the buffers of the arrays used with $SS_{13}get()$ or $SS_{13}put()$. FIG. 5 shows a conceptual view of how $SS_{13}get()$ works. In this Figure, the device driver associated with a stream fills a buffer (buffer A) 74 as data becomes available. At the same time, the application program is processing the current block of data. When the application uses $SS_{13}get()$ to place the next block of n data points in the array, the new buffer 74 that was filled by the input device 72 is swapped for the buffer 76 associated with that array. This is accomplished by changing one attribute of the array object, in particular the buffer printer, not by copying n words of data.

Therefore, the overhead of $SS_{13}get()$ and $SS_{13}put()$ is independent of the block size n. This affords a significant advantage, as does the fact that repeated copying is not needed in data handling.

Note that the actual physical buffer of the array has been changed by $SS_{13}get()$. This also happens with output operations using $SS_{13}put()$.

The attributes of a stream include the block size, device type, and direction of I/O. A stream is created with $SS_{13}create()$, and the attributes of a stream can be found and set using $SS_{13}stat()$ and $SS_{13}ctrl()$. Synchronization with devices can be accomplished using $SS_{13}flush()$. Details of the SS functions are documented in Reference publications (1), Section 5 and in (2), Section 2.

Vectors—A vector is a "view" of the memory in an array object. A view imposes a structure on the array's memory buffer, including a type for the data and the number of elements in the memory. Since a vector object only views the memory in an array, more than one vector can be built on an array.

Figure 7:
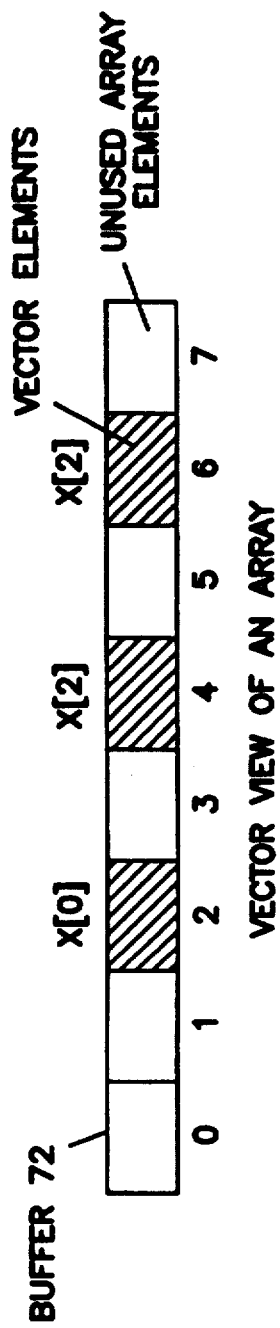
FIG. 7 is a block diagram depicting the organization of vectors.
Figure 8:
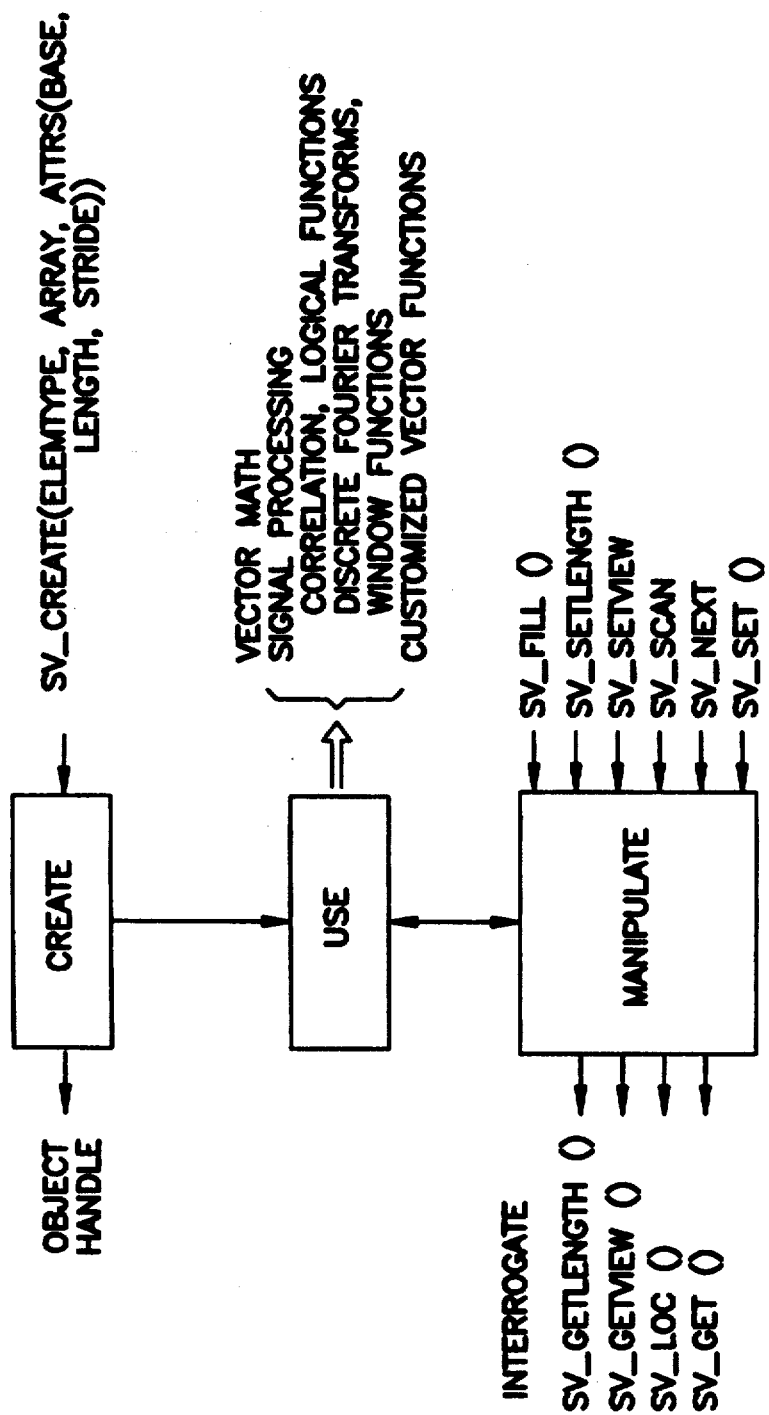
FIG. 8 is a flow chart illustrating in general terms the creation, use and manipulation of vectors.

Unlike a mathematical vector, this vector has base and stride attributes in addition to length. FIG. 7 shows a view imposed on an array's memory buffer. Again, the length is the number of elements in the vector. The length cannot exceed the capacity of the underlying array. It can, however, be shorter. An element is the storage needed for the type of data stored in the vector.

The base of a vector is the position of the first element [designated x[0]] in the vector relative to the first element in the array. If the first element of the vector occupies the n'th element of the array's buffer, then the base is $n-1$. In FIG. 7 the base is shown to be set to be 2, so x[0] corresponds to the third element in the array buffer 72. The base can be any number between 0 and the number of elements in the array minus one.

The final part of a view is the stride. The stride determines the number of array elements between successive vector elements. FIG. 7 shows a stride of two. In this example, x[1] occupies the second array element after x[0]. The stride provides the means to vary how the data in a memory buffer is accessed. Strides can be negative, so the data can be accessed in reverse order.

Vectors are created using $SV_{13}create()$, which takes an array object as an argument. The created vector views the memory referenced by the array. A vector's view can be manipulated by: $SV_{13}getbase()$ returns the base value of a vector view, while $SV_{13}getview()$ and $SV_{13}setview()$; the elements in a vector can be accessed in any order using $SV_{13}loc()$; for faster sequential access, you can use $SV_{13}scan()$ and $SV next()$. Details of SV functions are documented in Reference publications (1), Section 6 and Reference publication (2), Section 2.

All the math functions that operate on vectors are coded in assembly language to fully utilize the special architecture of the TMS320C30 for vector math functions. The assembly language program follows the C language interface, as specified in Reference publication (12), and in addition information on the vector (i.e. its view) is passed from the C program to the assembly routine via the data structure. Each assembly routine begins by retrieving the calling arguments (which include the vector object handle) according to the C interface, and then retrieves information about the vector from the object handle, using macro functions $SV_{13}$get and $SV_{13}$set. The object handle in all cases is a pointer to a C data structure which contains all necessary information about an object. For vector, these include such attributes as type, memory, location, length and stride. After the math routine is completed, certain registers are restored before returning to the C program, as specified by Reference publication (10). Details on writing assembly language programs for vectors and other object types are described in Reference publication (3). Macro functions that access all the different object types of higher level are discussed in Reference publication (3), Sections 3–5.

Vector math functions include arithmetic functions like vector multiply ($SV_{13}$mul2()), vector dot product ($SV_{13}$dotp()), and vector complex conjugate ($SV_{13}$conj()).

Logical operations are also provided for vectors containing Integer elements. Vector elements can be AND'ed ($SV_{13}$and2()) and OR'ed ($SV_{13}$or2()). Bit shifting can be accomplished using $SV_{13}$ash() and $SV_{13}$lsh().

Finally, functions for common signal processing operations are also available. The discrete Fourier Transform can be computed using $SV_{13}$fft(), correlation values can be found using $SV_{13}$corr(), window functions use $SV_{13}$window(), zero crossings are based on $SV_{13}$zerox(), and customized vector functions can be built on $SV_{13}$apply().

Further details on the vector math functions are provided in Reference publication (2), Section 3 and Reference publication (3), Section 3.

Matrix—The two-dimensional analog of a vector is a matrix. Like the vector object described above, a matrix object is a way of viewing the memory in an array object. Instead of viewing the elements as a linear sequence, a matrix views the elements as a rectangular array.

Figure 9:
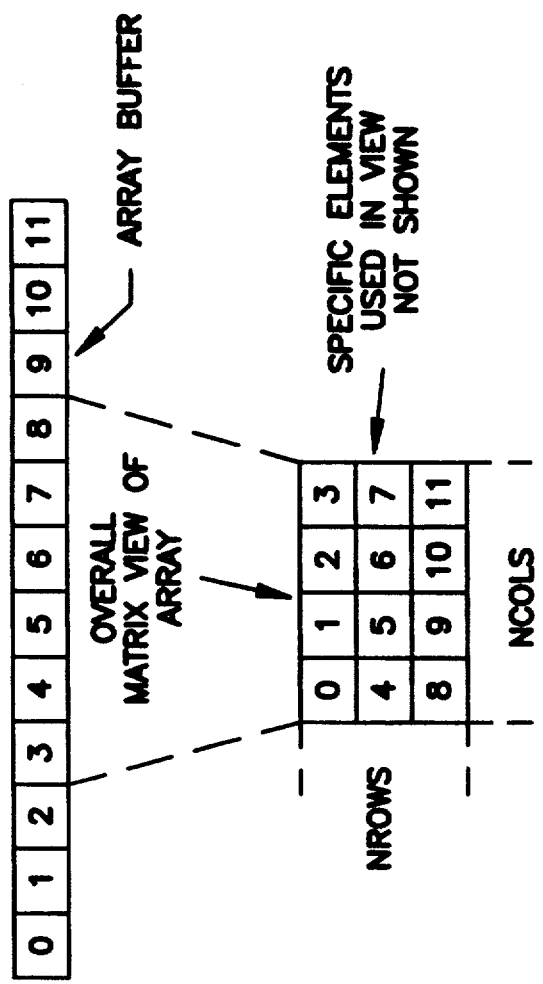
FIG. 9 is a block diagram depicting the organization of matrices.
Figure 10:
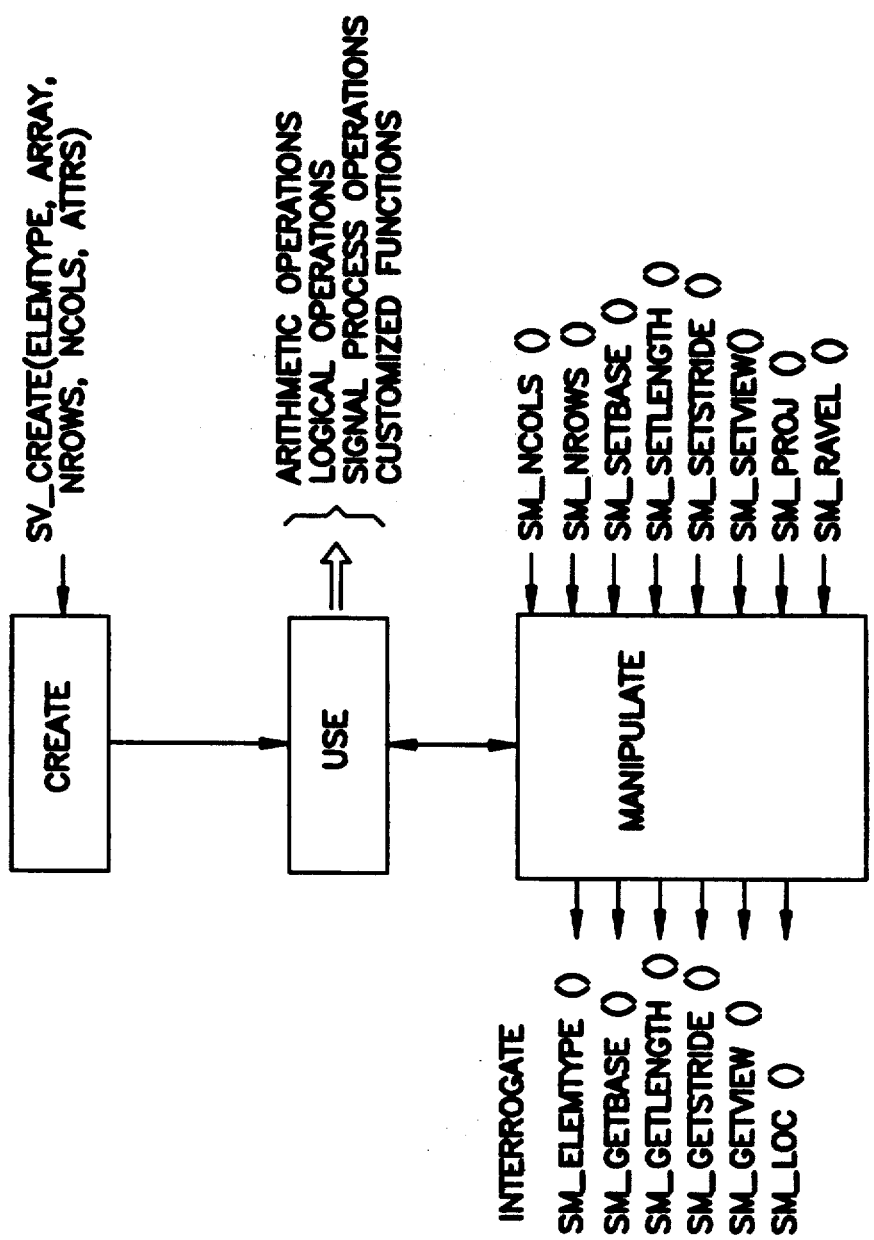
FIG. 10 is a flow chart illustrating in general terms the creation, use and manipulation of matrices.

This rectangular array is mapped onto the memory buffer with two attributes: the maximum number of rows and columns, nrows and ncols, respectively. These, together with the element data type (Int, Float, Complex), determine the "shape" of the matrix. FIG. 9 shows the layout of a 3×4 matrix. Note that the matrix object is laid out in row-major order.

The shape specified by nrows and ncols determines the outer boundaries of a matrix. What region is currently being used is given by the matrix view, which is represented by the $SM_{13}$View structure.

The meanings of length, base, and stride are the same as those for vectors. A matrix has a row view and a column view. The row or column attributes are specified in a matrix $SM_{13}$View using the constants $SM_{13}$ROW and $SM_{13}$COL.

The view can be changed using functions that find and change the base, stride, and length values. For example, $SM_{13}$getbase() will find the base value for either the row or column dimension. $SM_{13}$getview() and $SM_{13}$setview() find and change the total matrix view, respectively.

Individual elements of a matrix can be accessed using $SM_{13}$loc(). The notational convention matrix [i,j] used in the $SM_{13}$module denotes the (i,j)'th element of the matrix object. To actually access individual matrix element, $SM_{13}$loc (matrix, i, j) is used. For faster sequential access of matrix elements, the functions $SM_{13}$scan() and $SM_{13}$next() can be used.

The matrix module has a set of math functions very similar to those in the vector module. They are all programmed in TMS320C30 assembly language and follow the same C and matrix object interface described above for vector objects. Details on writing matrix math programs in assembly language is described in Reference publications (3).

There are several matrix arithmetic functions like $SM_{13}$add2(), which adds the elements of two matrices, and $SM_{13}$prodv(), which finds the product of a matrix and a vector. Logical operations such as XOR'ing two matrices ($SM_{13}$xor2()) are also available. Finally, efficient two-dimensional discrete Fourier transforms can be calculated using $SM_{13}$fft() and $SM_{13}$ifft(). Details on the $SM_{13}$functions can be found in Reference publications (1), Section 7, as well as in (2), Section 3 and (3).

Filter—The filter object encompasses the data and attributes needed to describe a finite impulse response (FIR), infinite impulse response (IIR), or all-pole filter. First, a filter object contains state arrays (memory) that store the state of the filter. A filter is created using $SF_{13}$create(), with the historical states and the attributes. Next, vectors of coefficients are associated with a filter object using $SF_{13}$bind(). The coefficients are used to implement the filter's transfer function.

The attributes of a filter object describe the data type used by the filter and the filter's structure. Filters can operate on either Float or Complex values.

The structure of a filter determines how the filter is actually implemented. Different structures have different properties that can be important in certain signal processing applications.

Regardless of the filter's type and structure, all filter objects use the same two functions to perform the actual filtering. $SF_{13}$apply() filters a vector of input samples, while $SF_{13}$1apply() filters a single input sample. This means that all filter objects are treated the same in the program. Instead of calling a different subroutine for each type of filter, one function is all that is needed. For adaptive filtering $SF_{13}$lms() implements an LMS adaptive filter.

In addition, a filter's state can be obtained and changed using $SF_{13}$getstate(), $SF_{13}$setstate() and $SF_{13}$reset(). These functions allow one to manipulate the state (or history) associated with a filter. Details of the SF functions are found in Reference publications (1), Section 8, (2), Sections 2 and 3, and (3).

The $SF_{13}$apply(), $SF_{13}$1apply(), and $SF_{13}$lms() functions are written in TMS320C30 assembly language following the same C and system interface described above and in Reference publication (3).

Device Drivers—The standard drivers that are included for a development system as described in conjunction with FIGS. 2 and 3 above are:

DG—software generators
DF—files
DS—serial ports.

The present stream I/O model is independent of the actual device generating, or consuming, data. In the case of the device type $DG_{13}$GEN, there is no hardware device. Instead, a software function generator produces sample values. There are several different generators available, each with its own device:
  DG$_{13}$SINE—sine waves
  DG$_{13}$RAND—random noise
  DG$_{13}$CONST—constant value
  DG$_{13}$USER—user-supplied function Devices of type DF$_{13}$FILE permit a development system (of the type of FIGS. 2 and 3) to perform stream I/O using the DOS file system. Up to ten different files can be accessed using the device id's DF$_{13}$CHAN0 ... DF$_{13}$CHAN9. The first three are connected to the standard input, output, and error file of the host. When an application program running on the DSP subsystem makes a stream I/O request, such as SS$_{13}$get, SS$_{13}$put, SS$_{13}$send and SS$_{13}$recv, the file device driver converts the stream I/O request into a DOS I/O request and sends the request to the host driver. To achieve streaming, the file device driver implements an input or output stream as an independent task which continuously fills or empties a series of data buffers (through the host driver) while the application program is executing on the DSP subsystem. As a result each stream I/O request from the application program can be responded to quickly with an exchange of buffer pointers, instead of blocking until the host driver (and the PC) completes the I/O function. The host driver handles DOS I/O requests from the file device driver just as it does for C standard I/O as described above.

High speed serial ports provide a fast and easy interface to many different interface devices. The device type DS$_{13}$SERIAL utilizes the serial port on the TMS320C30 to perform stream I/O to/from a TLC42044 Voice-Band analog Interface chip (Reference publication (15)) in a device-independent manner as described above for streams. The SS$_{13}$ctrl() function can be used to set parameters such as sampling rate and anti-aliasing filter selection. The serial port driver takes advantage of the on-chip DMA hardware, and consumes/produces a series of data buffers for an input or output stream. The driver is similar to the file device driver except it receives or transmits data from/to the TLC42044 chip instead of a host driver. To achieve streaming, a series of buffers is used for either the input or output stream so that the application program can run concurrently while buffers of data are being filled/emptied by the TLC42044 chip. Using the DMA, the device driver will receive a hardware interrupt only when a buffer of data of filled/emptied, thus minimizing the load of I/O operation on the DSP subsystem.

Examples—The following examples of vector and matrix math use terms described in Reference publication (2) and elsewhere in the other references. The examples are given merely to demonstrate how readily a number of advanced applications can be written for the DSP system.

Example 1—Discrete Fourier Transform—The discrete Fourier transform (DFT) of vectors is often needed in DSP applications. The functions SV$_{13}$fft() and SV$_{13}$ifft() calculate the DFT and inverse DFT of a vector using a fast Fourier transform (FFT) algorithm.

The implementation on a DSP processor uses hardware features to achieve maximum performance. Note that the current implementation requires a transform length equal to a power of two. To save calculations, a table of sine values is stored in a vector prior to a call to SV$_{13}$fft(). The function SV-table() is used for this purpose.

| SV_Vector | SV_table (vector, table) |
|---|---|
| SV_Vector | vector; |
| SV_Table | table; |

For FFTs, the value for table should be SV$_{13}$FOURIER. The table is a ¾ wave sine table. Thus, an N-point FFT requires a 3N/4 length table.

The FFT functions detect when a real vector is being used. They use this fact to reduce the number of computations by almost one-half. One must take this into account when setting the lengths of the vectors used by SV$_{13}$fft() and SV$_{13}$ifft(). The following table shows the length and element-type of the vectors for the various combinations of input and output vectors.

| INPUT TYPE | INPUT LENGTH | TRANSFORM LENGTH |
|---|---|---|
| Float | N | N/2 |
| Complex | N | N |

To permit the DFT to be stored in only N/2 elements, the DC (0th) term has both the 0th and N/2 values stored in it. Since the DC term and the term at N/2 are always real for a real input, they can be combined into one complex term. This should be taken into account when performing real FFTs. Both SV$_{13}$fft() and SV$_{13}$ifft() automatically handle this convention.

```
freq[0].real  = = DC term        (always real)
freq[0].imag  = = N/2 term       (always real)
#include <spox.h>
#include <math.h>
#define LEN           64  /*FFT length (must be
                              power of 2) */
#define ARRAYSIZE     LEN * sizeof(Float)
#define TABLESIZE     ((3 * LEN) / 4) * sizeof(Float)
Void smain()
{
    SV_Vector    cvec, mag, fvec, temp, table;
    SV_Cursor    vcur;
    Int          len;
    Float        error;
    table = SV_create(FLOAT, SA_create(SG_DRAM,
                TABLESIZE, NULL), NULL);
    fvec = SV_create(FLOAT, SA_create(SG_DRAM,
                ARRAYSIZE, NULL), NULL);
    cvec = SV_create(COMPLEX, SA_create(SG_DRAM,
                ARRAYSIZE, NULL), NULL);
    mag = SV_create(COMPLEX, SA_create(SG_DRAM,
                ARRAYSIZE, NULL), NULL);
    temp = SV_create(FLOAT, SA_create(SG_DRAM,
                ARRAYSIZE, NULL), NULL);
    SV_table(table, SV_FOURIER);
    for (len = SV_scan(fvec, &vcur); len > 0;
            len--) {
        *(Float *)SV_next(&vcur) = sin ((4.0 *
            M_PI * (len - 1)) / LEN );
    }
    SV_fft(fvec, cvec, table);
    SV_abs(cvec, mag);
    for (len = SV_scan(mag, &vcur); len > 0;
            len--) {
        printf("%f
n", ((Complex *)SV_next(&vcur))
            ->real);
    }
    SV_ifft(cvec, temp, table);
    SV_sum(SV_abs(SV_sub2(fvec, temp), temp),
    &error);
    printf("absolute sum error = %f
n", error);
```

This example illustrates the use of the DFT functions. The first part of the program creates the needed vectors. Since the input to the FFT is real, the transform vector, cvec, only needs to be half the length of the input vector, fvec. Because of the symmetry in the DFT of a real vector, only the first half of the DFT is calculated.

The sine values for the FFT and inverse FFT are calculated using $SV_{13}table()$. The input vector is filled with the a sinusoid. $SV_{13}fft()$ calculates the DFT of fvec and the magnitude of the spectrum is found using $SV_{13}abs()$. These magnitude values are stored in the real part of the complex vector, spec.

The final part of the program does an inverse DFT and computes the error produced performing back-to-back forward and inverse FFTs. The same sine table is used by $SV_{13}ifft()$ to find the inverse DFT of cvec. The total absolute error is then found using three math functions combined into one C statement. First, the difference between the original and the transformed vector is found using $SV_{13}sub2()$. $SV_{13}abs()$ takes the absolute value of each element in temp. Finally, the elements of temp are summed up and the result stored in error.

Example 2—Signal Processing Operations—The 2-D discrete Fourier transform is often used in image processing applications. The library functions, $SM_{13}fft()$ and $SM_{13}ifft()$, efficiently calculate the DFT of a matrix using fast Fourier transform algorithms. This example describes the use of these functions with matrix objects.

One could calculate the 2-D DFT of matrix using the vector (1-D) FFT functions in the vector library, along with some other matrix functions. However, the $SM_{13}fft()$ and $SM_{13}ifft()$ functions perform the operations more efficiently and with significantly less programming effort.

The convention used here is that the freq matrix represents the transform domain quantity, while time is the time, or perhaps better, the spatial domain. $SM_{13}fft()$ goes from time to frequency domain, and $SM_{13}ifft()$ does the inverse. The functions work with both Float and Complex data and as well as square or non-square matrices.

| SM_Matrix SM_fft(time, freq, rowtab, coltab) | |
|---|---|
| SM_Matrix | time; |
| SM_Matrix | freq; |
| SV_Vector | rowtab; |
| SV_Vector | coltab; |
| SM_Matrix SM_ifft (freq, time, rowtab, coltab) | |
| SM_Matrix | freq; |
| SM_Matrix | time; |
| SV_Vector | rowtab; |
| SV_Vector | coltab; |

The size of the transform is determined by the size of the matrices. The row and column lengths must be a power of 2.

The tables in rowtab and coltab contain sine values; they are generated using the $SV_{13}table()$ function. The length of these vectors should be ¼ the length of the matrix rows and columns.

The next example program performs a 2-D FFT using $SM_{13}fft()$. The magnitude of the transform is found using $SM_{13}abs()$.

```
#include <spox.h>
#define DEFSIZE    32
Void smain()
```

```
{
    SM_Matrix        time, freq;
    SM_Cursor        mcur;
    SV_Vector        table, vec;
    SV_Cursor        vcur;
    SA_Array         array;
    Int              size = DEFSIZE;
    Int              i, j;
    array = SA_create(SG_DRAM, size * size *
             sizeof(Float), NULL);
    time = SM_create(FLOAT, array, size, size,
             NULL);
    array = SA_create(SG_DRAM, 2 * size * size *
             sizeof(Float), NULL);
    freq = SM_create(COMPLEX, array, size, size,
             NULL);
    array = SA_create(SG_SRAM, (size * 3/4) *
             sizeof(Float), NULL);
    table = SV_create(FLOAT, array, NULL);
    SV_table(table, SV_FOURIER);
    SM_fill(time, 0.0);
    for (i = 0; i < SM_getlength(time, SM_ROW);
             i++) {
        *(Float *)SM_loc(time, i, i) = 1.0;
    }
    SM_fft(time, freq, table, table);
    SM_abs(freq, freq);
    for (i = SM_scan(freq, SM_row, &mcur); i > 0;
             i--) {
        vec = SM_next(&mcur);
        for (j = SV_scan(vec, &vcur); j > 0;
                 j--) {
            printf("&f
n", ((Complex *)SV_next
                     (&vcurr))→real);
        }
    }
}
```

The main points of concentration are the table generation and the sizes of the matrices. Since the matrices are square, the same sine table can be used for the rowtab and coltab. Once everything is set up, the actual transform is simple—a single function call. The actual number of computations involved is relatively high, however.

Effectively, a 2D FFT calculates an FFT along each of the rows (N) and then calculates another set of FFTs along each of the columns (N). Thus there are 2Nlength N FFTs calculated. This means the number of calculations is proportional to N: log N. One prefers to keep N small if this program is run on a PC.

Summary—The primary objectives of a system for programming and operating a computer having augmented I/O, memory and math capabilities, such as a DSP, are that the software generation of complex functions be readily accomplished and that the computer execution be at high speed, preferably in real-time. The present system achieves these goals by a number of interrelated factors. One factor is the arrangement of modules or managers for different abstract objects in a hierarchical fashion to provide a virtual DSP machine. Another is that the hierarchy is based on the basic unit of an array object type, together with a stream object type which is also device independent. Yet another factor is that the math functions are not only object oriented but based on the arrays as well.

For these and other reasons, evident from the present description and the supporting publications, the system affords significant advantages in addition to those given above. The math functions are executed rapidly and efficiently, with great versatility available because of the number of functions available in the library and the ease of adding more. Present systems incorporate more than 125 math functions, and the library is readily extensible through use of the abstract objects and macro functions. Although object-oriented, the system has higher rather than lower efficiency than other configurations.

The virtual DSP machine is not limited to one particular hardware configuration but is fully portable because it is callable in high level language and fully independent of hardware. Portation does not, furthermore, mean loss of flexibility.

Another advantage is that, unlike DOS and UNIX operating systems, there is little need for making levels of copies to perform I/O functions. The array object type and the manner in which GET and PUT operations are carried out enables copy steps to be greatly reduced. Moreover, overhead entries and communications are also substantially lowered in comparison to prior systems.

The system also uniquely affords implementation of the stdio interface to a host on the DSP type of processor. This not only permits functioning with the host file device but is done without introducing special limitations or requirements.

Although various alternatives and modifications have been described it will be appreciated that the invention is not limited thereto but encompasses all forms and variations in accordance with the appended claims.

What is claimed is:

1. An apparatus for managing the operation f a digital signal processor (DSP), comprising:
   (a) a digital signal processor (DSP); and
   (b) virtual DSP machine means, performed by the DSP, for insulating computer programs executed by the DSP from the DSP's specific architecture, wherein functions of the DSP are accessed by the computer programs via a high-level programming interface, wherein the virtual DSP machine means comprises a plurality of modules arranged in a hierarchy, comprising:
      (1) an array module for creating arrays of data and allocating memory blocks therefor through the memory management means;
      (2) a stream module for processing continuous data streams being input and output by the I/O devices coupled to the DSP, comprising means for binding the I/O devices to the computer programs, means for transferring the data between the arrays and the I/O devices, and means for invoking device-dependent control functions for the I/O devices;
      (3) a vector module for creating vectors of data that provide a one dimensional view of the arrays, and for performing vector math operations on the vectors;
      (4) a matrix module for creating matrices of data that provide a two dimensional view of the arrays, and for performing matrix math functions on the matrices; and
      (5) a filter module for creating finite impulse response filters, infinite impulse response filters, and all-pole filters, and for applying the filters to the vectors.

2. A digital signal processing apparatus, comprising:
   (a) a digital signal processor (DSP) having a plurality of memory segments comprising memories of different sizes and speeds coupled thereto;
   (b) array module means, performed by the DSP, for creating arrays of data and allocating memory blocks therefor from the memory segments;
   (c) stream module means, performed by the DSP, for processing continuous data streams being input and output by I/O devices coupled to the DSP, comprising means for binding the I/O devices to computer programs executed by the DSP, means for transferring the data between the arrays and the I/O devices, and means for invoking device-dependent control functions for the I/O devices;
   (d) vector module means, performed by the DSP, for creating vectors of data that provide a one dimensional view of the arrays, and for performing vector math operations on the vectors;
   (e) matrix module means, performed by the DSP, for creating matrices of data that provide a two dimensional view of the arrays, and for performing matrix math functions on the matrices; and
   (f) filter module means, performed by the DSP, for creating finite impulses response filters, infinite impulse response filters, and all-pole filters, and for applying the filters to the vectors.

3. A digital signal processing apparatus, comprising:
   (a) a digital signal processor (DSP);
   (b) real-time kernel means, performed by the DSP, for multi-tasking a plurality of concurrently operating computer programs executed by the DSP;
   (c) memory management means, coupled to the real-time kernel means and performed by the DSP, for managing memory requests from the computer programs executing on the DSP;
   (d) interrupt handling means, coupled to the real-time kernel means and performed by the DSP, for processing interrupts from I/O devices coupled to the DSP with minimum overhead;
   (e) device driver support means, coupled to the real-time kernel means, invoked by the computer programs and the interrupt handling means, and performed by the DSP, for handling data input and output by the I/O devices as signaled by the interrupt handler means; and
   (f) virtual DSP machine means, coupled to the real-time kernel means and performed by the DSP, for insulating the computer programs executing on the DSP from the DSP's specific architecture, wherein functions of the DSP are accessed by the computer programs via a high-level programming interface, and wherein the virtual DSP machine means comprises a plurality of modules arranged in a hierarchy comprising:
      (1) an array module for creating arrays of data and allocating memory blocks therefor through the memory management means;
      (2) a stream module for processing continuous data streams being input and output by the I/O devices coupled to the DSP, comprising means for binding the I/O devices to the computer programs, means for transferring the data between the arrays and the I/O devices, and means for invoking devicedependent control functions for the I/O devices;
      (3) a vector module for creating vectors of data that provide a one dimensional view of the arrays, and for performing vector math operations on the vectors;
      (4) a matrix module for creating matrices of data that provide a two dimensional view of the arrays, and for performing matrix math functions on the matrices;

(5) a filter module for creating finite impulse response filters, infinite impulse response filters, and all-pole filters, and for applying the filters to the vectors; and (6) wherein the modules are selectively executed by the DSP.

4. The invention as set forth in claim 3 above, wherein the virtual DSP machine means further comprise an exception handler module for managing system and application exceptions, for classifying the exceptions as major and minor, and for binding handlers to the exceptions.

5. The invention as set forth in claim 3 above, wherein the stream module further comprises software file device means for inserting and extracting the data in the data streams.

6. The invention as set forth in claim 3 above, wherein the virtual DSP machine means further comprises macro means for retrieving and manipulating arrays, vectors, matrices and filters.

7. The invention as set forth in claim 3 above, wherein the arrays each reference a block of memory in at least one of the memory segments.

8. The invention as set forth in claim 3 above, wherein the virtual DSP machine means further comprises a global definition module for assigning symbolic names to the memory blocks, for assigning symbolic names to the I/O devices coupled to the DSP, and for defining configuration parameters associated with the apparatus.

9. The invention as set forth in claim 3 above, wherein the interrupt handling means further comprises means for managing software interrupts triggered from hardware interrupt service routines.

10. The invention as set forth in claim 3 above, further comprising means, performed by the DSP, for providing software signal generators comprising random noise, sinusoidal wave and constant value generators.

11. The invention as set forth in claim 3 above, wherein the device driver support means further comprises:

(1 means for using a first buffer in a first I/O operation, wherein the first buffer is identified by a first pointer;

(2) means for waiting for an I/O request from a computer program executed by the DSP, wherein the request includes a second pointed to a second buffer; and (3) means for replacing the second pointer in the I/O request with the first pointer, so that the first buffer is returned to the computer program while the second buffer is sued in a second I/O operation.

12. The invention as set forth in claim 11 above, further comprising a plurality of buffers maintained in a queue for a single I/O stream.

13. The invention as set forth in claim 11 above, wherein there are a plurality of I/O devices, a plurality of first and second I/O operations directed concurrently at various ones of the plurality of I/O devices, and a plurality of first and second buffers for use in each of the plurality of first and second I/O operations.

14. The invention as set forth in claim 11 above, wherein the first and second buffers used in each of the plurality of first and second I/O operations have different sizes.

15. The invention as set forth in claim 3 above, wherein the memory management means comprises means for allocating and de-allocating variable-sized blocks of memory from a plurality of memory segments comprising memories of different sizes and speeds coupled to the DSP.

16. The invention as set forth in claim 4 above, wherein each request to the memory management means comprises at least two attributes associated therewith, wherein the attributes comprises a physical size of the block and the memory segment where the block is located.

17. The invention as set forth in claim 16 above, wherein the attributes further comprise an alignment field indicating that the block is aligned on a particular boundary.

18. The invention as set forth in claim 15 above, wherein the memory management means comprises means for mapping the blocks to physical locations in the memory segments.

19. The invention as set forth in claim 3 above, further comprising:

(1) a host computer operatively coupled to the DSP, wherein the host computer executes at least one computer program concurrently with the DSP and the operating system; and (2) means, executed by the host computer, for transferring data between the host computer and the DSP.

20. The invention as set forth in claim 19 above, wherein the host computer operates under control of a separate operating system and operates concurrently with the computer programs executed by the DSP.

21. The invention as set forth in claim 19 above, wherein the means for transferring comprises means, executed by the DSP, for accessing a file system on the host computer.

22. The invention as set forth in claim 19 above, wherein the DSP includes a file device, and the host computer includes a computer program for servicing requests from the file device, wherein the means for transferring further comprises means for communicating with the file device using a stream I/O module.

23. The invention as set forth in claim 19 above, wherein the means for communicating comprises a remote procedure call.

24. The invention as set forth in claim 19 above, further comprising external memory coupled to the DSP.

25. The invention as set forth in claim 24 above, further comprising means for sharing the external memory coupled to the DSP with the host computer.

* * * * *

UNITED STATES PATENT AND TRADEMARK OFFICE
CERTIFICATE OF CORRECTION

PATENT NO. : 5,283,900

DATED : February 1, 1994

INVENTOR(S) : Robert E. Frankel et al.

It is certified that error appears in the above-identified patent and that said Letters Patent is hereby corrected as shown below:

Column 3, line 2, "(May 31, 1989)" should read --(Mar. 31, 1989)--. Column 9, line 22, after "from" strike the period ("."); line 30, "$SA_{13}$" (three occurrences) should read --$SA_{\_}$--; line 31, "$SA_{13}$" (two occurrences) should read --$SA_{\_}$--; line 32, "$SA_{13}$" should read --$SA_{\_}$--; line 57, "$SS_{13}$" (two occurrences) should read --$SS_{\_}$--; line 60, "$SS_{13}$" (two occurrences) should read --$SS_{\_}$--; line 68, "$SS_{13}$" (two occurrences) should read --$SS_{\_}$--. Column 10, line 1, "$SS_{13}$" should read --$SS_{\_}$--; line 5, "$SS_{13}$" should read --$SS_{\_}$--; line 12, "$SS_{13}$" (two occurrences) should read --$SS_{\_}$--; line 17, "$SS_{13}$" should read --$SS_{\_}$--; line 18, "$SS_{13}$" should read --$SS_{\_}$--; line 21, "$SS_{13}$" should read --$SS_{\_}$--; line 22, "$SS_{13}$" (two occurrences) should read --$SS_{\_}$--; line 24, "$SS_{13}$" should read --$SS_{\_}$--; line 55, "$SV_{13}$" should read --$SV_{\_}$--; line 58, "$SV_{13}$" should read --$SV_{\_}$--; line 59, "$SV_{13}$" should read --$SV_{\_}$--; line 60, "$SV_{13}$" should read --$SV_{\_}$--; line 61, "$SV_{13}$" should read --$SV_{\_}$--; line 62, "$SV_{13}$" should read --$SV_{\_}$--; line 62, "SV" should read --$SV_{\_}$--. Column 11, line 22, "($SV_{13}$" should read --($SV_{\_}$--; line 23, "($SV_{13}$" should read --($SV_{\_}$--; line 24, "($SV_{13}$" should read --($SV_{\_}$--; line 28, "$SV_{13}$" should read --$SV_{\_}$--; line 29, "$SV_{13}$" should read --$SV_{\_}$--; line 32, "$SV_{13}$" should read --$SV_{\_}$--; line 33, "$SV_{13}$" should read --$SV_{\_}$--; line 34, "$SV_{13}$" should read --$SV_{\_}$--; line 35, "$SV_{13}$" should read --$SV_{\_}$--; line 36,

UNITED STATES PATENT AND TRADEMARK OFFICE
CERTIFICATE OF CORRECTION

PATENT NO. : 5,283,900

DATED : February 1, 1994

INVENTOR(S) : Robert E. Frankel et al.

It is certified that error appears in the above-identified patent and that said Letters Patent is hereby corrected as shown below:

"$SV_{13}$" should read --$SV_-$--; line 57, "$SM_{13}$" should read --$SM_-$--; line 61, "$SM_{13}$" should read --$SM_-$--; line 62, "$SM_{13}$" (two occurrences) should read --$SM_-$--; line 65, "$SM_{13}$" should read --$SM_-$--; line 66, "$SM_{13}$" should read --$SM_-$--; line 67, "$SM_{13}$" should read --$SM_-$--. Column 12, line 2, "$SM_{13}$" should read --$SM_-$--; line 3, "$SM_{13}$" should read --SM--; line 5, "$SM_{13}$" should read --$SM_-$--; line 6, "$SM_{13}$" should read --$SM_-$--; line 7, "$SM_{13}$" should read --$SM_-$--; line 16, "$SM_{13}$" should read --$SM_-$--; line 17, "$SM_{13}$" should read --$SM_-$--; line 19, "($SM_{13}$" should read --($SM_-$--; line 21, "$SM_{13}$" should read --$SM_-$-- (two occurrences); line 22, "$SM_{13}$" should read --SM--; line 29, "$SF_{13}$" should read --$SF_-$--; line 31, "$SF_{13}$" should read --$SF_-$--; line 42, "$SF_{13}$" should read --$SF_-$--; line 43, "$SF_{13}$" should read --$SF_-$--; line 47, "$SF_{13}$" should read --$SF_-$--; line 50, "$SF_{13}$" should read --$SF_-$--; line 51, "$SF_{13}$" should read --$SF_-$--; line 55, "$SF_{13}$" should read --$SF_-$-- (three occurrences); line 67, "$DG_{13}$" should read --$DG_-$--. Column 13, line 3, "$DG_{13}$" should read --$DG_-$--; line 4, "$DG_{13}$" should read --$DG_-$--; line 5, "$DG_{13}$" should read --$DG_-$--; line 6, "$DG_{13}$" should read --$DG_-$--; line 7, "$DF_{13}$" should read --$DF_-$--; line 10, "$DF_{13}$" should read --$DF_-$--; line 11, "$DF_{13}$" should read --$DF_-$--; line 14, "$SS_{13}$" should read --$SS_-$-- (two occurrences); line 15,

UNITED STATES PATENT AND TRADEMARK OFFICE
CERTIFICATE OF CORRECTION

PATENT NO. : 5,283,900

DATED : February 1, 1994

INVENTOR(S) : Robert E. Frankel et al.

Page 3 of 4

It is certified that error appears in the above-identified patent and that said Letters Patent is hereby corrected as shown below:

"$SS_{13}$" should read --SS_-- (two occurrences); line 31, "$DS_{13}$" should read --DS_--; line 33, "TLC42044" should read --TLC32044--; line 35, "$SS_{13}$" should read --SS_--; line 43, "TLC42044" should read --TLC32044--; line 47, "TLC42044" should read --TLC32044--; line 67, "$SV_{13}$" should read --SV_--; line 67, "SV-table" should read --SV_table--. Column 14, line 8, "$SV_{13}$" should read --SV_--; line 14, "$SV_{13}$" should read --SV_-- (two occurrences); line 28, "$SV_{13}$" should read --SV_--; line 29, "$SV_{13}$" should read --SV_--; line 60, after "%f" insert --\--; line 62, "→" should read --$>$ --; line 66, after "%f" insert --\--. Column 15, line 9, "$SV_{13}$" should read --SV_--; line 10, "$SV_{13}$" should read --SV_--; line 12, "$SV_{13}$" should read --SV_--; line 17, "$SV_{13}$" should read --SV_--; line 21, "$SV_{13}$" should read --SV_-- (two occurrences); line 26, "$SM_{13}$" should read --SM_--; line 27, "$SM_{13}$" should read --SM_--; line 33, "$SM_{13}$" should read --SM_-- (two occurrences); line 38, "$SM_{13}$" should read --SM_--; line 39, "$SM_{13}$" should read --SM_--; line 59, "$SV_{13}$" should read --SV_--; line 63, "$SM_{13}$" should read --SM_--; line 64, "$SM_{13}$" should read --SM_--. Column 16, line 28, after "f" insert --\--; line 30, "→" should read -- $>$ --; line 44, "2Nlength" should read --2N length--; line 46, "N" (first occurrence) should read --$N^2$--. Column 17, line 30, after "operation", "f" should read --of--.

UNITED STATES PATENT AND TRADEMARK OFFICE
CERTIFICATE OF CORRECTION

PATENT NO. : 5,283,900
DATED : February 1, 1994
INVENTOR(S) : Robert E. Frankel et al.

It is certified that error appears in the above-identified patent and that said Letters Patent is hereby corrected as shown below:

Column 19, line 43, "(1means" should read --(1) means--; line 48, after "second" (first occurrence), "pointed" should read --pointer--; line 53, after "is", "sued" should read --used--.

Column 11, line 27, "$SV_{13}$" (two occurrences), should read -- $SV_{\_}$ --.

Column 13, lines 59&60, "$SV_{13}$" should read --$SV_{\_}$--.

Signed and Sealed this

Sixth Day of December, 1994

Attest:

BRUCE LEHMAN

*Attesting Officer*    Commissioner of Patents and Trademarks